Sept. 21, 1965 D. E. GRISWOLD 3,207,312
AUTOMATIC CONTROL SYSTEM FOR SINGLE TANK SAND FILTER
Filed Aug. 5, 1960 4 Sheets-Sheet 3
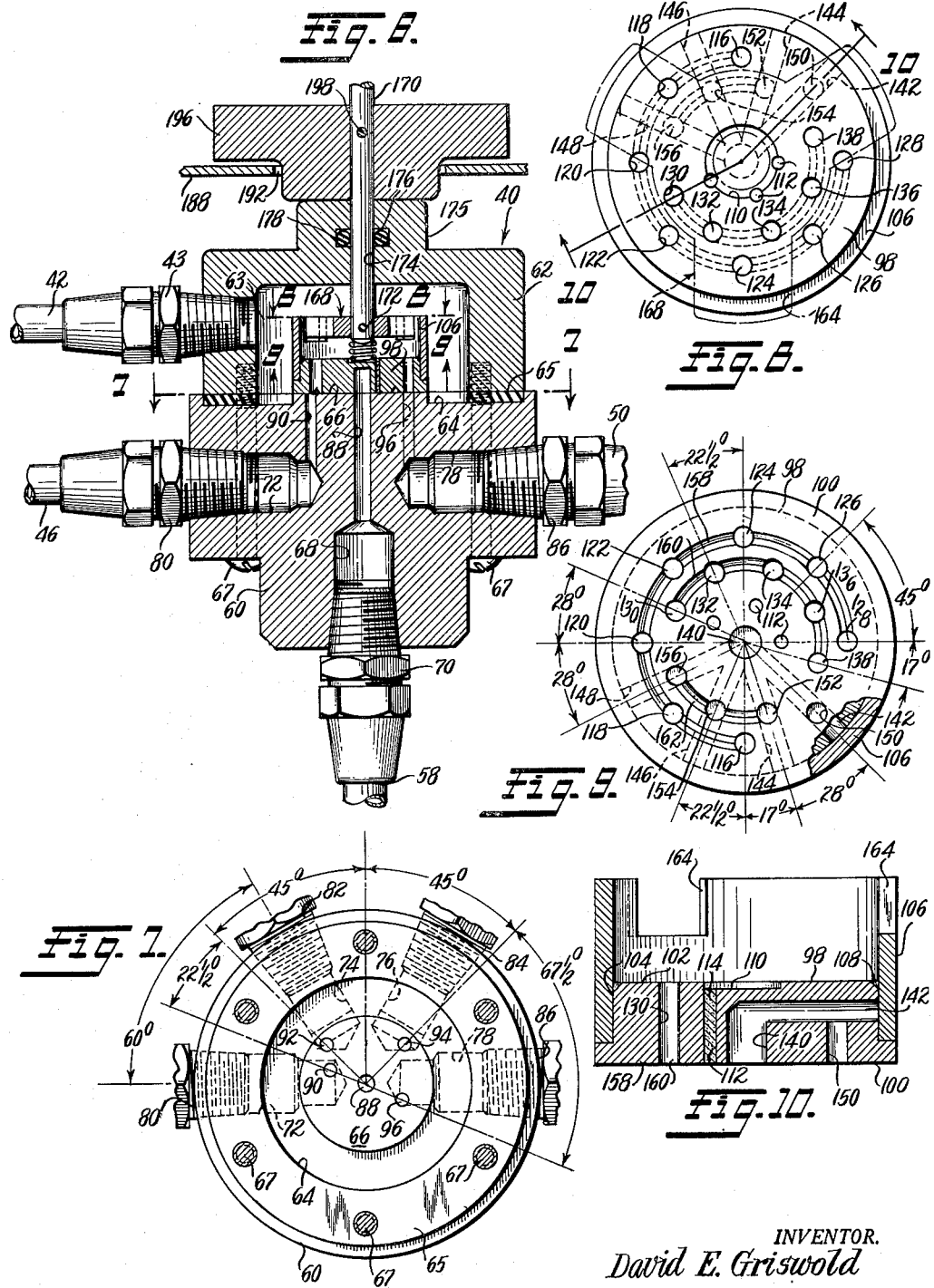
INVENTOR.
David E. Griswold
BY
Bacon & Thomas
ATTORNEYS Sept. 21, 1965  D. E. GRISWOLD  3,207,312
AUTOMATIC CONTROL SYSTEM FOR SINGLE TANK SAND FILTER
Filed Aug. 5, 1960  4 Sheets-Sheet 4

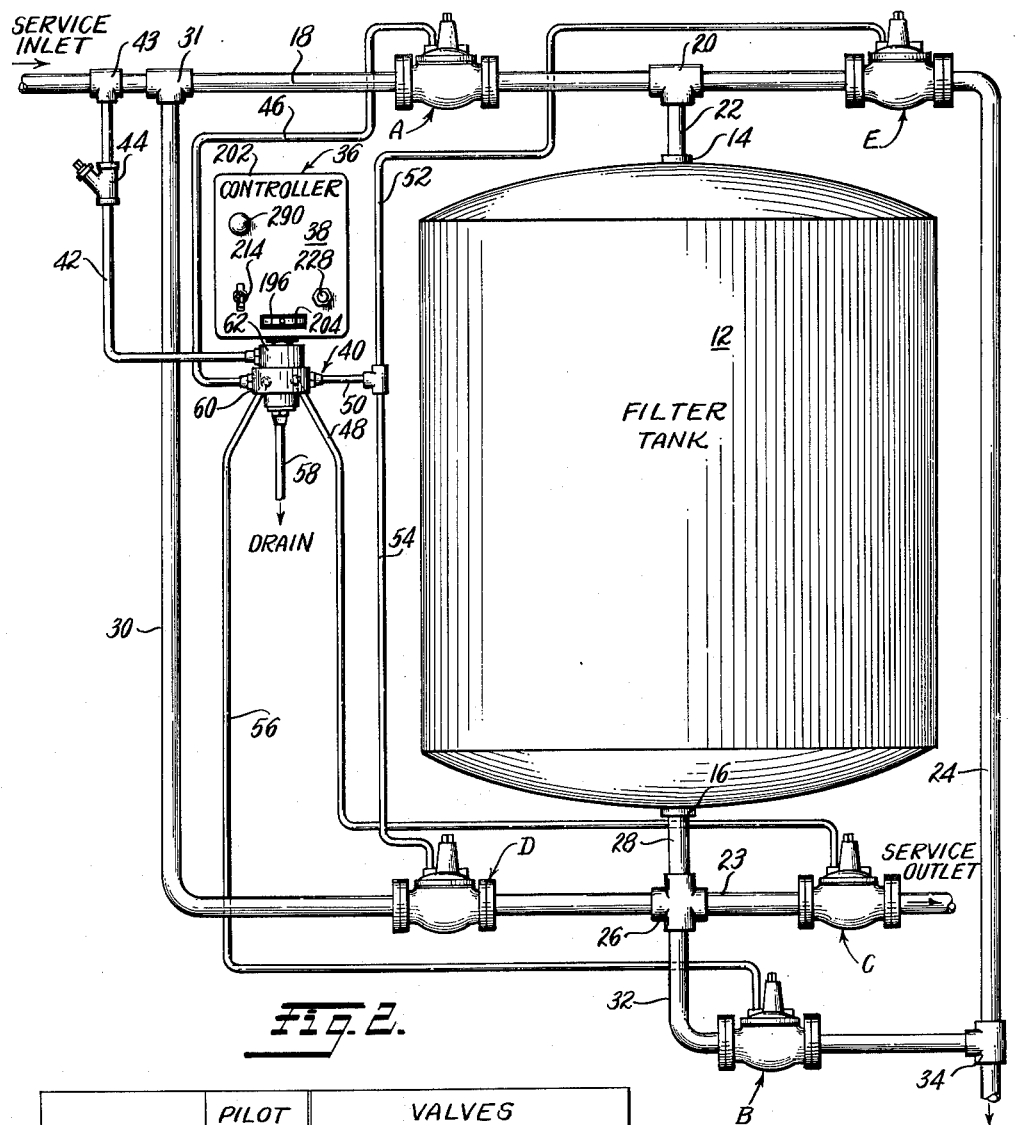

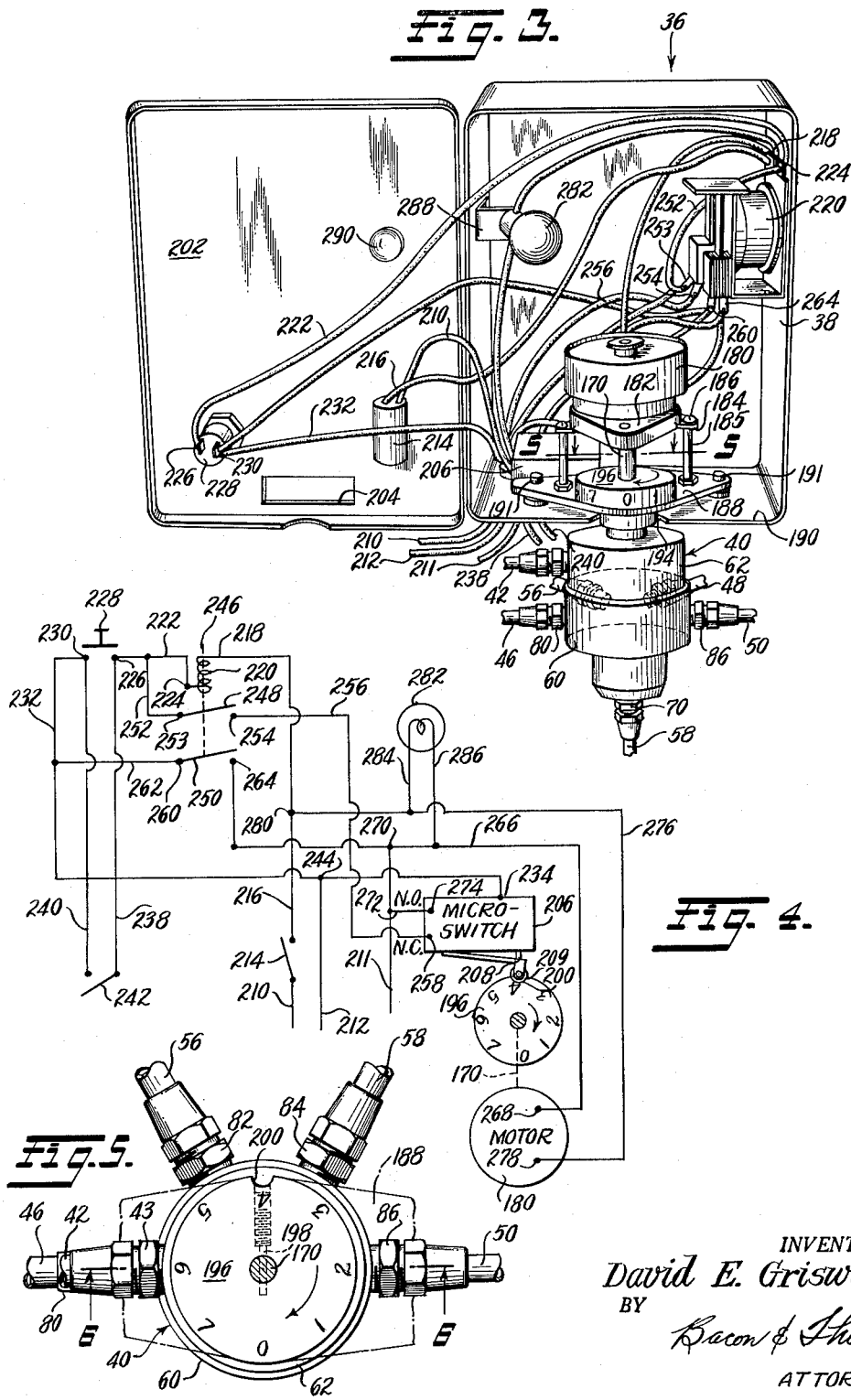

PILOT DISC IN "SERVICE"
POSITION NO. 0

PILOT DISC IN "OFF"
POSITION NO. 1

PILOT DISC IN "BACKWASH"
POSITIONS NOS. 2, 3 & 4

PILOT DISC IN "OFF"
POSITION NO. 5

PILOT DISC IN "RINSE"
POSITION NO. 6

PILOT DISC IN "OFF"
POSITION NO. 7

INVENTOR.
David E. Griswold
BY
Bacon & Thomas
ATTORNEYS

United States Patent Office 3,207,312
Patented Sept. 21, 1965

3,207,312
AUTOMATIC CONTROL SYSTEM FOR SINGLE TANK SAND FILTER
David E. Griswold, Newport Beach, Calif., assignor to Donald G. Griswold, Newport Beach, Calif.
Filed Aug. 5, 1960, Ser. No. 47,842
13 Claims. (Cl. 210—141)

The present invention relates to an automatic control system for use with apparatus requiring sequential actuation of a series of valves for effecting a cycle of operation, and more particularly, to a controller for a sand filter having a series of hydraulically operated flow control valves connected therewith, and an electrically operated pilot valve controlling the supply of operating fluid to said valves. The controller includes an electrically driven cycle timing device, which controls the pilot valve to effect opening and closing of said series of fluid pressure operated valves in proper, timed sequence to effect:

(1) Cutting off service flow;
(2) Effecting reverse flow or backwashing through the filter tank to remove filtered-out solids therefrom;
(3) Rinsing of the filter tank; and
(4) Restoration of service flow.

The present controller includes a control box having a pushbutton mounted thereon that can be manually actuated to start the cycle timer from the control box, and a remote control switch that can be actuated to start the cycle timer from a remote point. Actuation of either the pushbutton, or the remotely located switch, will start the timing device connected with the pilot valve for rotating a pilot disk within the pilot valve at a uniform speed. The pilot valve is designed so that it completes a cycle of backwashing and rinsing in a single revolution of its disk, and within a predetermined time interval.

Accordingly, the principal object of the invention is to provide control means for apparatus requiring sequential operation of a set of valves, and wherein the control means can be actuated from either a proximate or remote point to effect a cycle of operation of the valves.

Another object is to provide a pilot valve that will automatically effect the cycle of operation described above.

Still another object is to provide a rotary pilot valve that is simple in construction, easy to manufacture, and offers a minimum of resistance to rotation.

Still another object is to provide a versatile pilot valve that can cause closing of one or more fluid pressure operated valves while simultaneously allowing opening of one or more similar valves, in prescribed sequence.

A further object is to provide a rotary pilot valve having a disk and seat with ports arranged on concentric circles, so that a single disk can perform the function of a plurality of rotary valves each having a single circle of passages.

A still further object is to provide a rotary pilot valve in which operating fluid can be continuously delivered through a controlled passage in the valve without requiring a port extending through the pilot disk to be directly in registry with the controlled passage.

A more specific object is to provide a sand filter for filtering water or some other liquid, and control means for the filter that will enable an operator to recondition the filter, at will.

Other features and further objects of the invention will be apparent from the following description taken in conjunction with the accompanying drawings, in which:

FIG. 1 is a diagrammatic view of a sand filter having the present automatic control system connected therewith;

FIG. 2 is a sequence diagram of the cycle of operation of the sand filter control system of FIG. 1, indicating the various steps in the cycle of operation, and the various valves which are closed or open during the different stages of the cycle;

FIG. 3 is a perspective view of the controller box or housing as seen with its cover in wide-open position, revealing the pilot valve, motor, relay, and wiring comprising the component parts of the electrically operated portion of the control system for the filter;

FIG. 4 is a schematic wiring diagram of the electrical control system;

FIG. 5 is a fragmentary horizontal sectional view taken on the line 5—5 of FIG. 3, particularly showing the tube connections for operating fluid extending from the pilot valve, and a pilot valve position-indicating cam for actuating a microswitch in the electrical control circuit;

FIG. 6 is an enlarged vertical sectional view of the pilot valve, taken on the line 6—6 of FIG. 5;

FIG. 7 is a plan view of the pilot disk seat on the fluid distributing base of the pilot valve, taken on the line 7—7 of FIG. 6;

FIG. 8 is an enlarged plan view of the rotary pilot disk, showing a driving element therefor in dotted lines, as viewed on the line 8—8 of FIG. 6;

FIG. 9 is a bottom plan view of the pilot disk as viewed on the line 9—9 of FIG. 6, with a portion of the disk thereof in cross-section;

Figure 11:
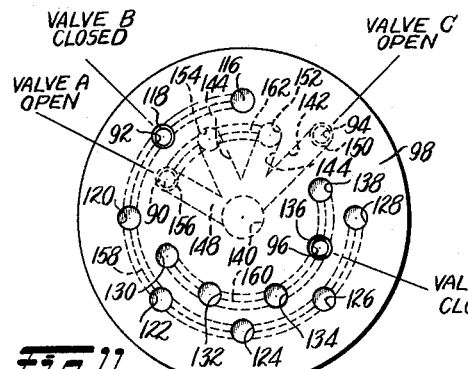

FIG. 10 is a vertical sectional view through the pilot disk, taken on the line 10—10 of FIG. 8; and FIGS. 11-16, inclusive, are diagrammatic views showing the relative position of the ports of the pilot disk and seat, corresponding to the pilot disk positions numbered 0, 1, 2 to 4, 5, 6, and 7, respectively, on the cam shown in FIG. 5, and corresponding to the open or closed condition of the flow control valves for same-numbered position noted in the diagram of FIG. 2.

In order to illustrate an operative embodiment of the present automatic control system, the same has been illustrated, and will be described herein, in connection with a sand filter in a water filtering system. However, it is to be understood that the invention is applicable to other system, such as water softening systems, chemical treating systems, swimming pool controls, lawn sprinklers, etc., which require a predetermined sequence of operation of a plurality of flow control valves.

Referring to the drawings, FIG. 1 diagrammatically illustrates the present control system associated with a conventional sand filter tank 12 adapted to filter water or other liquid. The filter tank has an inlet 14 at its upper end and an outlet 16 at its lower end. A supply conduit 18, connected with a source of water to be filtered, is connected to the inlet 14 by a pipe-T 20 and a pipe nipple 22. A discharge or service conduit 23 for conducting filtered water from the tank 12 to a point of use is connected with the outlet 16 by a four-way fitting 26 and a pipe nipple 28.

The supply conduit 18 has a fluid pressure actuated supply valve A connected therein for controlling the flow of untreated liquid to the tank inlet 14. A service valve C is connected in the service conduit 23 for controlling the flow of filtered liquid through said conduit. A waste conduit 24 is connected at one end with the filter tank inlet 14 through the pipe-T 20 and nipple 22. A waste valve E, similar to the valves A and C, is connected in the waste conduit 24 to control the flow of water from the the filter tank 12 to a point of waste, as will be explained more fully hereinafter.

A backwash conduit 30 is connected at one end with the supply conduit 18 by a pipe-T 31, and its other end is connected with the outlet 16 through the four-way fitting 26 and pipe nipple 28. A backwash valve D is connected in the conduit 30 to control the flow of water into the lower end of the filter tank 12 to effect backwashing, as will be described hereinafter.

A drain conduit 32 is connected at one end with the four-way fitting 26 and is connected at its opposite end with the waste conduit 24 by a pipe-T 34 located downstream of the waste valve E. A drain valve B, similar to the valves A, C, D, and E, is connected in the drain conduit 32 between the four-way fitting 26 and the pipe-T 34. The valve B controls the flow of rinse water from the filter tank 12 to the waste conduit 24 during a filter rinsing operation, as will be described later.

The valves A, B, C, D, and E are subject to the exclusive control of a controller generally identified by the numeral 36. The controller 36 includes a box or housing 38, which serves as a mounting for a pilot valve 40 located exteriorly thereof. Operating fluid under pressure is supplied to the pilot valve 40 through a tube 42, which is connected at one end by a pipe-T 43 with the supply conduit 18, and is connected at its opposite end with the pilot valve 40. A conventional strainer 44 is connected in the tube 42, between the pipe-T 43 and pilot valve 40.

Operating fluid under pressure is distributed by the pilot valve 40 through: tube 46 to the supply valve A; tube 48 to the service valve C; tube 50 and branch tubes 52 and 54 to the waste valve E and backwash valve D, respectively; and tube 56 to the drain valve B. An exhaust tube 58 is connected with the pilot valve 40 for disposing of spent operating fluid.

The pilot valve 40 is shown in FIGS. 6, 7, 8, 9 and 10, and includes a housing having a base 60 and an overlying cover 62. The cover 62 is hollow and provides a pressure chamber 63 to which operating fluid under pressure is supplied through the tube 42 and a fitting 43.

The upper surface of the base 60 is provided with an annular recess 64, which is occupied, in part, by a sealing ring or gasket 65, disposed between the upper surface of the base and the bottom edge of the cover 62. A series of screws 67 pass through aligned openings in the base 60 and gasket 65, and into threaded holes in the cover 62, to retain the cover gasket and base in assembled relation. The annular recess 64 defines an elevated, circular seat 66.

The lower end of the base 60 has an axial drain bore 68 threaded at its outer end to receive a fitting 70, which connects the drain tube 58 to the pilot valve. The base 60 also includes four radial bores 72, 74, 76 and 78, FIG. 7, disposed in the same plane, each with its axis on an angle of 60° relative to an adjacent bore. These bores are threaded at their outer ends to receive fittings 80, 82, 84 and 86, respectively (FIG. 7), and connect the conduits 46, 56, 48 and 50, respectively, in fluid communication with the pilot valve base (see FIG. 5).

The base 60 has an axial drain port 88, FIG. 6, having one end connecting with the bore 68, and the other end opening at the center of the valve seat 66, and axially extending passages 90, 92, 94 and 96, which communicate at one end with the radial bores 72, 74, 76 and 78 respectively, and open as ports at their upper ends in the surface of the valve seat 66. It should be noted, with reference to FIG. 7, that the passages 90 and 96 lie on one circle having its center at the axis of the drain port 88, and that the passages 92 and 94 lie on a concentric circle having a greater radius. It should also be noted that the passages 90, 92, 94 and 96 do not coincide with the axes of the bores 72, 74, 76 and 78, respectively, but are offset relative thereto. As will be seen in FIG. 7, the passages 90 and 96 are diametrically disposed and offset approximately 22½° relative to the longitudinal axes of the bores 72 and 78, respectively, and that the axes of the passages 92 and 94 are substantially 90° apart. It should also be noted that the passages 90 and 92 are spaced 22½° apart, and that the passages 94 and 96 are spaced approximately 67½° apart.

A rotary pilot disk 98 is disposed in the pressure chamber 63 to cooperate with the passages in the base 60 to control the flow of operating fluid in both directions through the several pressure tubes connected to the base 60.

The pilot disk 98 has a lower surface 100 in sliding contact with the seat 66. The surface 100 of the pilot disk 98 and the surface of the valve seat 66 are lapped to provide a fluid tight contact. The disk 98 has a peripheral channel 104 to receive one end of a sleeve 106, the disk and sleeve being joined by soldering at 108. An upper surface 102 on the disk 98 is provided with a recess 110, and a series of lubricating passages 112 extend through the disk and contain lubricating material 114. The disk 98 also includes a series of ports or apertures 116, 118, 120, 122, 124, 126 and 128, arranged on a circle, and passing in an axial direction through the disk. These ports are spaced approximately 45° apart, thereby providing an angle of 90° between the ports 116 and 128.

A second series of ports 130, 132, 134, 136 and 138 is disposed on a circle concentric with and of a smaller radius than the circle occupied by the apertures 116 to 128. The ports 130 to 138 pass through the valve disk, and are staggered relative to the ports 120 to 128 on the outer circle, as is clearly shown in FIGS. 8 and 9. The angular spacing of the ports 130 to 138 is not uniform, but may be arranged to obtain the desired sequential timing of the several valves to be controlled.

The lower surface 100 of the disk 98 has an axial port 140 extending inwardly therefrom and partially through the disk, the inner end of the port being connected with four radial passages 142, 144, 146 and 148. The outer ends of these radial passages are blocked by the lower portion of the sleeve 106, as is clearly shown in FIGS. 9 and 10, to prevent loss of fluid from the pressure chamber 63 to the drain passage 88. A vertical port or axial passage 150 connects the radial passage 142 with the lower surface 100 of the disk, and similarly, ports 152, 154 and 156 connect the radial passages 144, 146 and 148 with the surface 100. The radial passages 142, 144, 146 and 148, in cooperation with the vertical ports 140, 150, 152, 154 and 156 form a series of generally U-shaped exhaust passages communicating at one end with the drain passage 88 in the base, and communicating at their outer ends with the valve seat 66 on one of the circles formed by the ring of ports 130 to 138 and 116 to 128. Specifically, the axial passage or port 150 adjacent the outer end of the radial passage 142 lies on a circle of the same diameter as that occupied by the outer ring of ports 116 to 128 (FIG. 9). The axis of the port 150 is disposed on a radial line at an angle of 45° from the axes of the ports 128 and 116. Similarly, the ports 152, 154 and 156, adjacent the outer ends of the radial passages 144, 146 and 148, respectively, lie on the same diameter of circle occupied by the ports 130 to 138, the ports 152, 154 and 156 being staggered relative to the port 150 and the ports 116, 118 and 120, as shown in FIG. 9.

The ports 120 and 130 are angularly spaced 28°, the ports 154 and 116 are spaced 22½°, the ports 116 and 152 are spaced 17°, the ports 152 and 150 are spaced 28°, the ports 128 and 138 are spaced 17°, and the ports 124 and 132 are spaced 22½°. While the ports 116 to 128 in the outer circle are uniformly spaced, this is not the case with the ports 130 to 138 in the inner circle. This spacing is important for the particular embodiment disclosed in order to give the operation desired.

It should be noted that the radius of the circle occupied by the ports 130 to 138 and the ports 152, 154 and 156 is the same as the radius of the circle occupied by the passages or seat ports 90 and 96 in the base, and that the radius of the circle occupied by the ports 116 to 128 and 150 is the same as the radius of the circle occupied by the passage or seat ports 92 and 94.

Referring to FIGS. 9 and 10, a first arcuate channel 158 of V cross-section is formed in the lower surface 100 of the disk 98 and interconnects the ports 116 to 128. A second arcuate channel 160, also of V cross-section, is formed in the lower surface 100, and interconnects the ports 130 to 138; and a third arcuate channel 162, also of V cross-section, is formed in the lower surface 100 and interconnects the ports 152, 154 and 156. From an inspection of FIG. 9, it will be noted that the first arcuate channel 158 extends through an arc of approximately 270°, that the second arcuate channel 160 extends approximately 180° and that the third arcuate channel 162 extends approximately 90°.

The upper end of the sleeve 106 on the pilot disk 98 is provided with three equally spaced axially extending slots 164 adapted to receive radial arms 166 of a driving member 168, shown in dotted lines in FIG. 8 and in solid lines in FIG. 6. The driving member 168 is fastened to the lower end of a pilot drive shaft 170 by a pin 172. The shaft 170 extends through a bearing 174 in an upper wall of the cover 62 (FIG. 6). The upper wall carries a boss 175 having an internal recess 176 adapted to receive an O-ring 178 forming a seal, preventing loss of operating fluid from the chamber 63 along the shaft 170.

The shaft 170 is driven by an electric motor 180 (FIG. 3), through conventional reduction gearing and a one-way clutch (not shown) enclosed in a housing 182. The housing 182 has a series of spaced lugs 184, which engage spacing sleeves 185 and are secured by bolts 186, extending through said sleeves, to a mounting plate 188. The mounting plate 188 is secured to a bottom wall 190 of the housing 38 by fasteners 191.

The upper end of the shaft 170 is attached to the driven member of the one-way clutch, for a purpose to be explained hereinafter. The mounting plate 188 is provided with an aperture 192 (FIG. 6) through which the shaft 170 and a cam 196, secured against rotation by a pin 198, pass. The bottom wall 190 of the housing 38 includes a slot 194 for the reception of the hub of the cam 196, as is shown in FIG. 3.

The periphery of the cam 196 is provided with a notch or dwell 200, FIGS. 4 and 5, adapted to cooperate with a roller 208 carried by an arm 209 of a microswitch 206. The outer periphery of the cam 196 is provided with a series of uniformly spaced numerals, 0, 1, 2, 3, 4, 5, 6 and 7. A door 202 is hingedly mounted on the housing 38 and has a slot 204 near its lower edge. When the door 202 is closed, as shown in FIG. 1, a portion of the cam 196 projects outwardly through the slot sufficiently for one of the numerals on its periphery to be visible. This projection also facilitates access for manual actuation of the cam 196 when desired, for a purpose to be set forth hereinafter. It should be noted, with reference to FIG. 5, that the dwell 200 is disposed diametrically opposite the position indicated as 0. In this position, the 0 is visible through the slot 204, and the cam roller 209 rests in the dwell 200, in which position the motor 180 is inactive.

The wiring and electrical circuit for the controller 36 is illustrated in FIGS. 3 and 4, and comprises two power input leads 210 and 212, which may be connected to any source of 115 volt A.C. power supply. A third conductor 211 is an output lead for power to operate external equipment (not shown) during the regeneration cycle, such as effecting resetting of a water meter after a preset gallonage has run out. The circuit includes a main or toggle switch 214, which is mounted in an opening in the door 202 and actuatable from the outer side of the door, to enable an operator to close and open the circuit, at will.

The circuit is schematically shown in FIG. 4 and includes points of connection of various conductors not clear in FIG. 3. As shown, the circuit includes a conductor 216 that extends from the switch 214 to a contact 218 of a relay coil 220. A conductor 222 extends from the other contact 224 of the relay coil to one contact 226 of a push button switch 228, mounted on the door 202 where it can be operated from the exterior of the housing 36. The other contact 230 of the push button switch 228 is connected by a conductor 232 with a normal terminal 234 of the microswitch 206. The contacts 226 and 230 of the push button switch are respectively connected with conductors 238 and 240 adapted to be interconnected by a remote control switch 242 for closing the controller circuit from a remote point. The lead 212 is connected with the conductor 232 at a point 244.

The relay coil 220 contains an armature 246 that is connected with switches 248 and 250 for simultaneously operating the same. One contact 253 of the switch 248 is connected by a lead 252 with the conductor 222. The other contact 254 of the switch 248 is connected by a conductor 256 to a normally closed terminal 258 of the microswitch 206. One contact 260 of the switch 250 is connected by a lead 262 with the conductor 232. The other contact 264 of the switch 250 is connected by a conductor 266 with one terminal 268 of the pilot motor 180. The conductor 211 is connected with the conductor 266 at the point 270. A lead 272 connects the conductor 211 with the normally closed contact 274 of the microswitch 206. A conductor 276 connects the other terminal 278 of the motor 180 with the input lead 216 at the point 280. An indicator light 282 is connected by conductors 284 and 286 with the conductors 266 and 276, respectively, whereby said indicator light is connected in parallel with the motor 180. The signal lamp 282 is supported on a bracket 288 mounted within the housing 38 behind a reflector 290 on the hinged door 202, so that said reflector is positioned in front of the signal lamp 282 when the door is closed to display a suitable color light when the motor 180 is in operation.

The motor 180 may be a low-powered synchronous motor or any other type of constant speed motor having a relatively low power output. The motor 180, through the reduction gearing in the housing 182, rotates the pilot disk 98 through one complete revolution for each regeneration cycle of the filter. The length of a complete cycle of operation can vary considerably, depending upon the particular time requirements for each phase or step for a particular size of filter unit. The motor speed and the gears in the reduction gearing may be selected to provide the desired time interval to complete the cycle in one revolution of the pilot disk 98.

In the illustrative embodiment described, the control valves A, B, C, D, and E are fluid pressure actuated, under the control of the pilot valve 40, in a manner such that the delivery of pressure fluid to the tube connections 46, 56, 48, 54 and 52 effects closing of the valves in the conduits 18, 32, 23, 30 and 24, respectively. The release of pressure fluid from these tubes allows opening of the valves aforesaid by spring force, or by line pressure in the conduits, or by a combination of both. Pressure-actuated valves of this type are conventional and well known in the art and a detailed description thereof is unnecessary. It is to be understood, however, that pressure actuated valves of the type that is opened by the application of pressure fluid in the tubes 46, 48, 52, 54, and 56, and which is closed by the exhaust of pressure through such tubes, may be substituted for the type of valve previously mentioned. However, in the event that the latter type of valve is used, the pressure and drain porting in the pilot disk would have to be reversed.

The present control circuit is intended to be energized manually by closing the toggle switch 214 and momentarily operating the push button switch 228, or by momentarily closing the remote control switch 242 while the toggle switch 214 is closed. It is to be understood that the circuit can be closed automatically, if desired, in response to an impulse or electrical signal from a time clock (not shown) or from a transducer (not shown) measuring a process variable, either of which can be substituted for the remote impulse switch 242. When once started, the motor 180 normally continues in operation until the end of the regenerating cycle, which is indicated by one complete revolution of the pilot disk 98 and associated cam 196. At the end of the cycle, all of the valves are returned to their initial SERVICE position and the motor 180 is de-energized, as will be explained more fully hereinafter. The cycle can be manually interrupted at anytime by opening the toggle switch 214.

Controller 36 can be actuated in any one of the several ways described above to place the apparatus in operation to effect a regenerating cycle. Assuming that the toggle switch 214 is closed and that the push button 228 has been moved into position to momentarily bridge the contacts 226 and 230, the relay coil 220 will be energized and the relay switches 248 and 250 closed. The circuit to initially energize the relay coil 220 is momentarily established through power lead 210, toggle switch 214, conductor 216, to one terminal 218 of the relay coil 220, through the relay coil to the other relay terminal 224, through conductor 222, push button switch 228, conductor 232 and power lead 210. The circuit to the relay coil 220 is maintained for a short interval by a holding circuit after the push button switch 228 is released. The holding circuit is established up to the conductor 222 in the manner described above. From this point, current flows through the lead 252, relay switch 248, conductor 256, normally closed contact 258 of microswitch 206, through the common contact 234 of the microswitch 206, to conductor 232 and to the other power lead 212. Thus, it will be noted that the relay coil 220 is now energized by its own switch 248 through the normally closed contact 258 of the microswitch 206.

Upon momentary actuation of the push button switch 228 to energize the relay coil 220, a circuit is completed to the motor 180, so that it immediately starts to drive the shaft 170 of the pilot valve 40. The circuit to the motor 180 is completed as follows: With the toggle switch 214 closed, the power lead 210 is always connected in circuit with the terminal 278 of the motor 180 through the conductors 216 and 276. Upon closing of the relay switch 250, current is supplied to the other terminal 268 of the motor 180 through the power lead 212, conductors 232 and 262, switch 250 and conductor 266. As the motor 180 rotates, it drives the cam 196 along with the pilot shaft 170. Hence, the relay coil 220 remains energized until the cam 196 raises the roller 209 out of the dwell 200 and the arm 208 actuates the microswitch 206 to open the normally closed contact 258 to interrupt the relay holding circuit. Interruption of the holding circuit results in the opening of the switches 248 and 250 so that the motor circuit would be also interrupted except for the fact that actuation of the microswitch 206 to open the normally closed contact 258 causes simultaneous closing of the normally open contact 274, so that current to the motor 180 is then supplied from the power lead 210 to the terminal 278 in the manner previously described. Current to the other terminal 268 of the motor 180 is then supplied through the power lead 212, the contact 234, through the microswitch 206 to contact 274, lead 272, and the conductors 211 and 266 to continue the motor in operation for the remainder of the cycle.

Upon closing of the normally open (N.O.) contact 274 of the microswitch 206, current supplied to the conductor 211 can be used to actuate a water meter reset motor (not shown) or any other equipment which it is desired to maintain in operation during a regenerating cycle.

The design of the cam 196 is such that it permits the relay coil 220 to be energized for a few minutes at the start of the cycle. The coil does not remain energized throughout the complete cycle, but only for the interval during which the roller 209 is being raised out of the dwell 200 in the cam 196. The time required for such movement and the resulting de-energizing of the relay coil will vary slightly, depending on the speed of the motor. The relay coil 220, having initiated the starting of the motor 180, is no longer required and is de-energized, resulting in a saving of electric current and adding to the effective life of the relay.

The cam roller 209 follows the periphery of the cam 196 and maintains the circuit to the motor 180. Operation of the motor 180 continues until the cam 196 and the pilot disk 98 have completed a full revolution, whereupon the cam roller 209 drops into the dwell 200, thereby breaking the circuit through the microswitch 206 and interrupting the circuit to the motor 180. Simultaneously with the opening of the motor circuit at the microswitch contact 274, the switch contact 258 is closed, ready for the initiation of a new cycle, but since there is no flow of current in the circuit at this time, a new cycle will not be started.

FIG. 4 illustrates the components of the electrical circuit in their inactive position, wherein the switches 214, 228 and 242 are open, the motor 180 is de-energized, and the cam follower 209 of the microswitch 206 rests in the dwell 200. At such time, the number 0 on the cam 196 would be visible through the opening 204 in the control cabinet door 202. The 0 position of the pilot disk 98 corresponds to the SERVICE operation of the filter, as indicated in FIG. 2, at which time the supply valve A and service valve C are open and all other valves are closed.

FIGS. 11, 12, 13, 14, and 16 are schematic views illustrating the relative position of the ports in the pilot disc 98 with respect to the passages in the base 60 corresponding to the number 0 to 7 position of the pilot disk 98 and effecting the operations indicated in FIG. 4. The passages 90, 92, 94, and 96 in the base 60 are shown smaller than the ports 116 to 128, 130 to 138, and 152 to 156 in the pilot disk 98 to facilitate illustration of the registering ports and passages. In actual construction, the passages in the base 60 have the same diameter as the cooperating ports in the valve disk 98.

FIG. 11 illustrates the pilot disk 98 in the SERVICE position corresponding to a normal filtering operation, the numeral 0 being visible through the slot 204 in the door 202 of the housing 38, and in which position the motor 180 is inactive. Pressure fluid in the pressure chamber 63 acts through the registering port 118 and passage 92, and tube 56, to maintain the drain valve B closed. Pressure fluid is also effective through the registering port 136 and passage 96, tube 50 and branches 52 and 54 to maintain the backwash and waste valves D and E closed. Tubes 46 and 48 are open to exhaust and now communicate with the drain tube 58 through drain port 88 in the base 60 and axial port 140 in the pilot disk 98, by way of the port 90 and radial passage 148, and by way of port 94 and radial passage 142, respectively, to relieve the pressure and to permit the supply valve A and service valve C to open. It may be seen from FIG. 1 that, with the valves in the positions specified, unfiltered water enters the service inlet 14 through supply conduit 18, valve A, pipe-T 20, and pipe nipple 22 and flows through the filter tank 12, outlet 16, pipe nipple 28, fitting 36, valve C, and service conduit 23 to the point of use.

Figure 12:
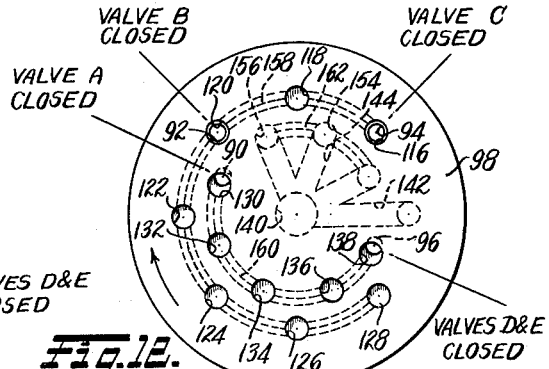

When the motor 180 is started, the pilot disk 98 slowly rotates in a clockwise direction, as indicated by the arrow in FIG. 12, and as it approaches the No. 1 or OFF position, is effective: through the port 116 and passage 94 to close the service valve C; through the port 120 and passage 92 to retain drain valve B closed; through port 130 and passage 90 to close the supply valve A; and through the port 138 and passage 96 to retain the backwash valve D and waste valve E closed. It should be observed that the valves B, D and E, which had previously been closed, remain in that position during movement of the valve from the No. 0 position shown in FIG. 11 to the No. 1 position shown in FIG. 12. Such operation occurs because of the interconnecting channels 158 and 160. Moreover, the service valve C, which was previously open, is closed slightly in advance of the closing of the supply valve A, because of the relative spacing of the ports in the pilot disk 98 and the passages in the seat 66. This feature assures that the filter tank 12 remains filled with liquid under pressure.

Figure 13:
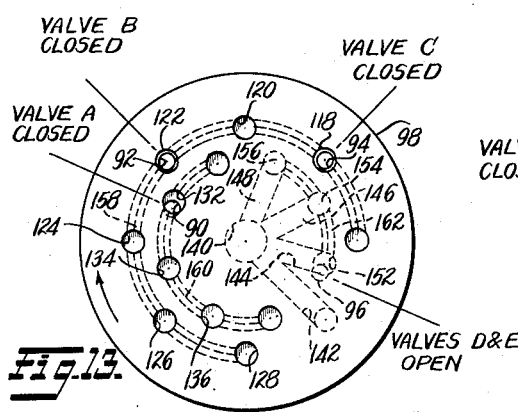

Continued rotation of the valve disk 98 to the No. 2 position, shown in FIG. 13, brings the seat passage 96 into register with the radial exhaust passage 144, permitting the draining of spent operating fluid from the tube 50, and branch tubes 52 and 54, allowing the waste valve E and backwash valve D to open. The remaining valves are retained closed by continued connection with the pressure chamber 63 afforded by registration of the port 122 and passage 92, port 118 and passage 94, and port 132 and passage 90, in cooperation with the interconnecting channels 158 and 160. This position of the pilot disk 98 represents the BACKWASH or reverse flow phase in which unfiltered water passes from the supply conduit 18 into backwash conduit 30, through backwash valve D, fitting 26, pipe nipple 28, outlet 16, filter tank 12, inlet 14, pipe nipple 22, pipe-T 20, and waste valve E and conduit 24 to waste. Such reverse flow flushes the filtrate out of the sand in the filter tank 12 to waste through conduit 24. It is intended that this particular phase of the regenerating cycle continue for a much greater length of time than the remaining phases, and to this end, the passages and ports in the pilot valve 98 are arranged to retain the valves A, B and C closed and the valves D and E open during the No. 2, 3 and 4 positions of the pilot valve, so that in effect these three positions institute but one valve operating position.

In the No. 3 position, the pilot disk 98 will have advanced 45° clockwise from the position shown in FIG. 13, which brings the port 120 in communication with the passage 94, the port 124 in communication with the passage 92, the port 134 in communication with the passage 90, and the radial exhaust passage 146 in communication with the passage 96. It will be seen, therefore, that during movement of the pilot valve from the No. 2 position to the No. 3 position just described, the valves A, B and C remain closed and the valves D and E remain open, due to the particular arrangement of the passages and ports, and the interconnecting channels 158, 160 and 162.

Between the pilot disk positions Nos. 3 and 4, the pilot disk 98 rotates another 45°, occupying a position 90° clockwise from that shown in FIG. 13. In this position, the port 122 registers with the passage 94, the port 126 registers with the passage 92, the port 136 registers with the passage 90, and the radial exhaust passage 148 registers with the passage 96. The valves A, B, C, D and E remain in their former positions, because of the particular arrangement of the seat passage, pilot ports and interconnecting channels in the pilot disk.

Figure 14:
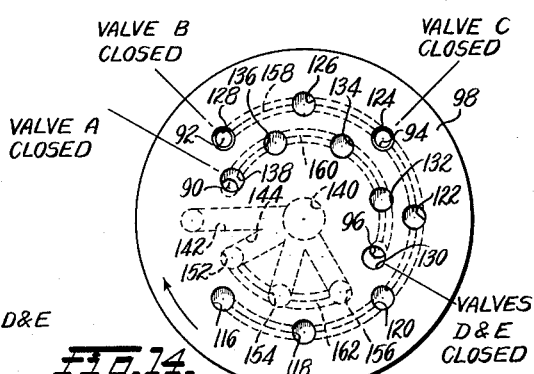

Continued rotation of the pilot disk 98 through another 45°, to the No. 5 or OFF position, shown in FIG. 14, results in a closing of all of the valves, terminating the BACKWASH phase. In this position, port 128 registers with passage 92, port 124 registers with passage 94, port 130 registers with passage 96, and port 138 registers with passage 90. The valves A, B and C, which were formerly closed, are retained in that position, because of the arrangement of the ports and the connecting channels, while the tube 50 and branch tubes 52 and 54, which were in communication with one of the exhaust ports in the pilot disk 98, are placed in communication with the pressure chamber 63, effecting closing of the backwash valve D and waste valve E.

Figure 15:
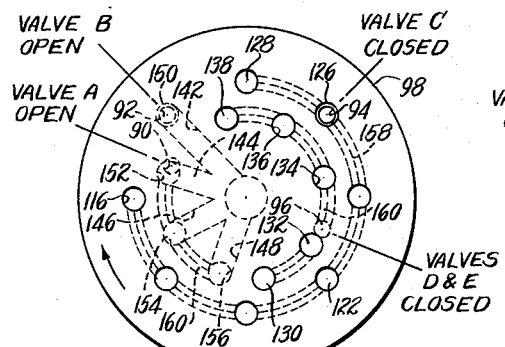

Continued movement of the pilot disk 98 to the No. 6 or RINSE position, shown in FIG. 15, effects opening of the supply valve A and the drain valve B, the valves C, D and E being retained closed by virtue of the following: port 126 registers with the passage 94, and port 132 is in communication with the passage 96 by way of the channel 160. At the same time, passages 90 and 92 communicate with the radial exhaust passages 144 and 142, respectively, leading to drain. In this position of the valves, unfilter water flows through supply conduit 18, open valve A, pipe-T 20 and pipe nipple 22 into inlet 14, through filter tank 12, outlet 16, pipe nipple 28, fitting 26, open valve B, and drain conduit 32 into waste conduit 24, effecting a RINSE phase of the sand in the filter tank.

Figure 16:
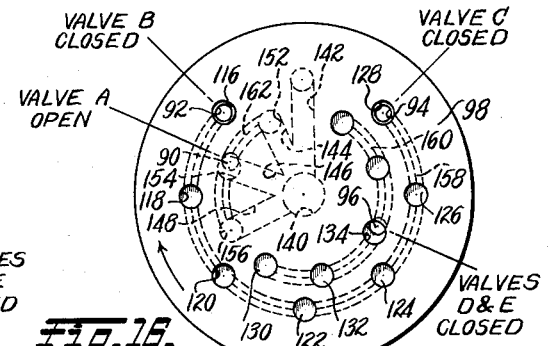

Continued rotation of the pilot disk 98 to the OFF or No. 7 position, shown in FIG. 16, results in a closing of the drain valve B, the supply valve A remaining open, and the valves C, D and E remaining closed. In this position, port 128 registers with the passage 94, and the port 134 registers with the passage 96. Between the positions of the pilot valve shown in FIGS. 15 and 16, fluid pressure is effective in the tube connections to the valves C, D and E, by way of the channels 158 and 160, to retain these valves closed, even though there is no axial registration between the ports and the passages. Similarly, the passages 90 and 146 are brought into register, retaining the supply valve A open, the fluid pressure in the tube 67 connected to the valve A being effective during the movement from the FIG. 15 position to the FIG. 16 position because of the connecting channel 162. The communication between the passages 92 and 142, shown in FIG. 15, is cut off, and the passage 92 is placed in communication with the port 116, as shown in FIG. 16, to close the drain valve B. In this position, unfiltered water is permitted to flow through conduit 18 and open valve A, into filter tank 12 to pressurize the system.

Allowing time for the liquid and the sand to become quiescent in the tank 12, the continued movement of the pilot valve 98 brings the parts to the 0 or SERVICE position shown in FIG. 11, completing the cycle, and stopping the operation of the motor 180, as has been described above. The service valve C is opened, the supply valve A, which was previously open, remains open, and the valves B, D and E remain closed. The system is thereupon restored to its service condition, all phases of the cycle having been performed automatically and in properly timed relation.

In the above-described operation, the channel 158 in the pilot disk 98 assures that the seat passages 92 and 94 are in communication with the pilot valve pressure chamber 63, by way of one or more of the pressure ports 116 to 128 during substantially 270° of rotation of the pilot disk, admitting pressure fluid to the tubes 56 and 48 to simultaneously retain the drain valve B and service valve C closed. Referring to FIGS. 16 and 11, movement of the pilot disk 98 from the No. 7 position to the No. 1 position, moves the port 128 out of register with the passage 94 leading to the service valve C. The pressure fluid in the passage 94 and tube 48 is trapped, and the service valve C is retained closed during the last 45° of rotation of the pilot valve, or until it approaches the No. 0 position of FIG. 11, when the passage 94 registers with the exhaust passage 142 and port 150 and the service valve C opens. As no pressure fluid acts in the tube 48 between the No. 0 position of FIG. 11 and the No. 1 position of FIG. 12, the service valve C remains open. It will be seen, therefore, that the service valve C remains closed during substantially 315° of rotation of the pilot disk 98, and remains open for SERVICE during the remaining substantially 45°. Similarly the drain valve B is closed during substantially 315° of rotation of the pilot disk 98, opening only at position No. 6, remaining open for substantially 45°. In a similar manner, the ports 130 to 138 and the arcuate recess 160 on the one hand, and the exhaust passages 142 to 148 and the arcuate channel 162 on the other hand, retain the service valve A closed from the No. 1 position to the No. 6 position, or substantially 236°, and retain the supply valve A open from the No.

6 position to the No. 1 position, or substantially 124°. Similarly, the valves D and E are retained closed for substantially 236° of pilot valve travel between positions 4 to 2, and open for substantially 124° of pilot valve rotation between position 2 to 4.

The arcuate channels 158, 160 and 162, in addition to assuring the continuous open and closed positions of the valves A, B, C, D and E, described above, afford pressure chambers in which the pressure fluid acts upwardly, in opposition to the pressure of the fluid in the pressure chamber 63, to counterbalance, to some degree, the pressure forcing the pilot disk 98 against the seat 66, and decreasing to some degree, the frictional resistance offered to rotation of the pilot disk on its seat.

The one-way clutch between the motor 180 and the cam 196 permits manual actuation of the cam and the pilot disk 98 in one direction at any time. If the motor 180 is not in operation, the cam 196 can be manually turned to any desired position, and left there so long as desired, or the entire cycle can be manually controlled. Similarly, during the operation of the motor 180, the various phases of the cycle may be advanced by manual turning of the cam.

While the above operation is described in connection with a water filtration device, it is evident that the controller could be employed to operate any other cyclically actuated device by an appropriate design of the rotary distributing or pilot valve.

Having fully described the invention, it is to be understood that various changes may be made therein without departing from the principles of the invention, or the scope of the annexed claims.

I claim:

1. A filtering system, comprising: a closed filter tank for receiving and maintaining liquid under hydraulic pressure having an inlet end and an outlet end; a supply conduit for supplying a liquid under pressure to be filtered connected with said inlet; a supply valve connected in said supply conduit controlling the flow of liquid to said inlet; a service conduit for filtered liquid under tank pressure connected with said outlet; a service flow control valve connected in said service conduit; a waste conduit connected with said inlet; a waste valve connected in said waste conduit; a backwash conduit connected at one end thereof with said supply conduit upstream of said supply control valve and connected at its opposite end with said outlet upstream of said service valve; a backwash valve connected in said backwash conduit upstream of the point of connection of said backwash conduit with said outlet; a drain conduit connected at one end with said outlet at a point between said backwash and service valves, said drain conduit being connected at its other end with said waste conduit downstream of said waste valve; a drain valve connected in said drain conduit upstream of its point of connection with said waste conduit; and rotary means constructed and arranged to move through a predetermined sequence of positions for operating and directly controlling all of said valves, to (1) close all valves when in a first sequence position; (2) close the supply, service, and drain valves and open the backwashing and waste valves to effect a backwashing or reverse flow of unfiltered liquid through the filter tank and discharge through the waste conduit when in a second sequence position; (3) close all valves when in a third sequence position; (4) open the supply and drain valves and close all of the other valves to effect a rinse flow through the supply conduit, filter tank, drain conduit and waste conduit when in a fourth sequence position; (5) open the supply valve and close the other valves to pressurize the filter tank when in a fifth sequence position; and (6) open the supply and service valves and close all of the other valves to effect a flow through the supply conduit, filter tank and service conduit when in a sixth sequence position.

2. A filtering system as defined in claim 1, in which the valves are fluid pressure actuated and in which said valve control means includes a rotary pilot valve and operating pressure-fluid connections between said pilot valve and the fluid-pressure actuated valves.

3. A filtering system as defined in claim 2, in which the operating pressure-fluid connections between said pilot valve and the backwash and waste valves have a common connection with the pilot valve for concurrent operation of said last-mentioned valves.

4. A filtering system as defined in claim 2, wherein the pilot valve has a rotary disk and a valve seat, the valve seat having a central passage connected with a drain and a plurality of other passages, arranged on concentric circles and communicating with said operating pressure-fluid connections, the rotary disk comprising a lower surface seated on the valve seat, said disk including a plurality of pressure ports passing therethrough and disposed on concentric circles having the same radii as the circles of said other passages in the valve seat and cooperating therewith, and said disk including an axial port communicating with the central passage in said valve seat and having a plurality of radial exhaust passages connected at one end thereof with said central axial port and having an open end on the seating surface of said disk and lying on one of said concentric circles.

5. A filtering system as defined in claim 4, in which the ports in the disk are disposed on two concentric circles and wherein the disk has arcuate grooves in its lower surface interconnecting the ports lying on the respective circles; a housing having a pressure chamber for operating fluid surrounding the disk; and means for admitting pressure fluid into said chamber, whereby pressure fluid within said chamber is effective to act through any of the ports on either circle to exert pressure in a passage having communication with a port on that circle.

6. A filtering system as defined in claim 5, wherein each of the arcuate grooves extends through an angle less than 360°.

7. A filtering system as defined in claim 5, wherein the disk has two arcuate grooves lying on one of the circles, and wherein one of said arcuate grooves interconnects certain pressure ports in said disk and the other of the arcuate grooves interconnects certain exhaust ports in said disk.

8. A filtering system as defined in claim 5, in which the pilot disk has pressure ports interconnected by the concentric grooves and in which the pressure ports lying on one groove are radially staggered in relation to the ports lying on the other groove.

9. A filtering system as defined in claim 5, in which the outer of the concentric grooves interconnects seven of the plurality of pressure ports disposed thereon, said pressure ports being spaced 45° apart, and in which an inner concentric groove interconnects five of the plurality of pressure ports disposed thereon, and wherein another inner concentric groove interconnects three of the plurality of exhaust ports lying thereon.

10. In a filtering system including a supply valve, a service flow control valve, a waste valve, a backwash valve, and a drain valve, all of said valves being fluid pressure-operable, a rotary pilot valve movable through a predetermined sequence of valve operating positions for controlling the supply and exhaust of operating fluid to said fluid pressure-operable valves, comprising: a housing having a pressure chamber adapted to be connected with a source of pressure fluid; a valve seat in said chamber; a rotatable pilot disk having a seating face in contact with said seat, said seat having a central drain port and a plurality of passages arranged thereabout on concentric circles, one of said passages being arranged for connection to said supply valve, another one of said passages being arranged for connection to said service flow control valve, a third one of said passages being arranged for connection in common to both said waste valve and said backwash valve, and a fourth one of said passages being arranged for connection to said drain valve, said disk having a plurality of pressure ports passing therethrough and disposed on concentric circles having the same radii as the circles of said passages in the valve seat and being cooperable therewith, said disk also having a central drain port and a plurality of radial exhaust passages connected at their inner ends with said central drain port and having axial passages at their outer ends opening onto the seating face of the valve disk, the axial passages at the outer ends of said radial exhaust passages being registerable with certain of said seat passages on said concentric circles, said seat passages, said pressure ports, and the axial passages of said radial exhaust passages being so spaced and arranged that when said rotary pilot valve is in certain valve operating positions in said predetermined sequence certain of said fluid pressure-operable valves will be opened while others thereof will be closed, and so that when said pilot valve is in others of said valve operating positions, said other positions being disposed between said first mentioned certain positions, all of said valves will be closed.

11. A rotary pilot valve as defined in claim 10, in which the pressure ports in the disk are disposed on two concentric circles, said disk having grooves in the seating face thereof interconnecting the valve seat ends of all of the pressure ports which lie on the respective circles, with one pressure port at each end of each groove.

12. A rotary pilot valve as defined in claim 10, in which there are four passages in the valve seat and wherein two of said passages lie on an inner circle and two on a concentric outer circle, and in which there are seven pressure ports and the axial passage of one radial exhaust passage, spaced 45° apart, on an outer circle of the valve disk and five pressure ports and the axial passages of three radial exhaust passages on a concentric inner circle of said disk, the diameter of the inner and outer circles on the disk and seat being, respectively, the same.

13. A rotary pilot valve as defined in claim 11, in which the axial passage portions of the radial exhaust passages of the pilot disk lying on the inner circle are interconnected by a groove separate from the groove interconnecting the pressure ports on said inner circle, and in which the axial passage portion of the radial exhaust passage lying on the outer circle is disposed between the ends of the groove interconnecting the pressure ports on said outer circle.

References Cited by the Examiner
UNITED STATES PATENTS

| | | | |
|---|---|---|---|
| 2,076,321 | 4/37 | Pick | 137—624 |
| 2,098,893 | 11/37 | Staegemann | 210—198 X |
| 2,387,444 | 10/45 | Hayslett et al. | 318—467 X |
| 2,564,529 | 8/51 | Griswold | 137—625.21 |
| 2,825,359 | 3/58 | Williams | 137—608 |
| 2,875,428 | 2/59 | Griswold | 137—624.16 |
| 2,906,332 | 9/59 | Rosten et al. | 210—139 X |
| 2,986,167 | 5/61 | Griswold et al. | 137—625.21 |

REUBEN FRIEDMAN, *Primary Examiner.*

HARRY B. THORNTON, HERBERT L. MARTIN,
*Examiners.*